United States Patent
Spreuwers

(10) Patent No.: US 8,282,726 B2
(45) Date of Patent: Oct. 9, 2012

(54) MODELLING COMPOSITION

(75) Inventor: Hartwig Spreuwers, Hamont-Achel (BE)

(73) Assignee: Trends2com BVBA (BE)

( * ) Notice: Subject to any disclaimer, the term of this patent is extended or adjusted under 35 U.S.C. 154(b) by 225 days.

(21) Appl. No.: 12/573,940

(22) Filed: Oct. 6, 2009

(65) Prior Publication Data

US 2010/0083870 A1    Apr. 8, 2010

(30) Foreign Application Priority Data

Oct. 6, 2008   (DE) .................. 20 2008 013 094 U
Oct. 30, 2008  (DE) .................. 20 2008 014 446 U

(51) Int. Cl.
*C08L 89/00*    (2006.01)
*C08L 3/02*     (2006.01)

(52) U.S. Cl. .................. 106/126.1; 106/132.1
(58) Field of Classification Search ............... 106/126.1, 106/132.1
See application file for complete search history.

(56) References Cited

U.S. PATENT DOCUMENTS

| | | | | |
|---|---|---|---|---|
| 1,384,917 A * | 7/1921 | Phillips | ............... | 106/126.3 |
| 4,172,054 A * | 10/1979 | Ogawa et al. | ........... | 524/18 |
| 4,956,404 A * | 9/1990 | Pelzig | ........... | 524/48 |
| 5,153,037 A * | 10/1992 | Altieri | ........... | 428/35.6 |
| 5,171,766 A * | 12/1992 | Mariano et al. | ........ | 523/218 |
| 5,279,658 A * | 1/1994 | Aung | ........... | 106/126.1 |
| 5,447,584 A * | 9/1995 | Shakespeare et al. | .... | 156/63 |
| 5,628,821 A * | 5/1997 | Bowling et al. | ....... | 106/126.1 |
| 5,980,880 A * | 11/1999 | Love | ........... | 424/76.1 |
| 6,359,057 B1 * | 3/2002 | Li | ........... | 524/557 |
| 6,713,624 B1 * | 3/2004 | Doane et al. | ........... | 536/45 |
| 7,553,363 B2 * | 6/2009 | Dellinger et al. | ....... | 106/162.51 |

FOREIGN PATENT DOCUMENTS

EP    0075934 A1    9/1982
GB    2337525 A     11/1999

* cited by examiner

*Primary Examiner* — David M Brunsman
(74) *Attorney, Agent, or Firm* — McCormick, Paulding & Huber LLP

(57) ABSTRACT

A modelling composition, in which there is no cracking likely to cause the modelling composition to disintegrate either during drying or during drying of the objects made from said composition, contains a compound made up of the components starch, an adhesive agent, common salt, water, calcium chloride, sodium benzoate, potassium hydrogen sulphate, liquid paraffin, propylene glycol and bittern.

9 Claims, No Drawings

MODELLING COMPOSITION

CROSS-REFERENCE TO RELATED APPLICATIONS

This application is entitled to the benefit of German Patent Application No. DE 202008013094.8 filed on Oct. 6, 2008 and German Patent Application No. DE 20200814446.9 filed on Oct. 30, 2008.

FIELD OF THE INVENTION

The invention relates to a compound, a modelling composition containing this compound, a method for its production and the use of this compound as a modelling composition.

BACKGROUND OF THE INVENTION

A modelling composition is described as a highly malleable clay or wax-like composition, which is used for simple modelling and play. Modelling compositions of this type are also referred to as modelling clay.

The modelling composition used for play should be harmless to the skin, but should not be suitable for consumption.

A wide variety of modelling compositions, which are also suitable for play purposes, are known from the state of the art.

Play material compounds, which are kneadable, malleable or can be used for modelling, enabling people or objects to be reproduced, are typically products of mineral origin, such as clay products, for example, or products of plant origin, such as starch products, for example.

However, all modelling compositions disclosed hitherto have disadvantages. Many modelling compositions are too expensive to produce, given their intended use. Other modelling compositions have properties that mean they are only malleable at particular temperatures or with the addition of further components. A particularly serious disadvantage is the formation of cracks, which appear in objects made from or with the known modelling compositions during the course of time. Cracks appear relatively quickly, particularly in the surface of objects made from these sorts of modelling compositions, and these ultimately affect not only the practical value, but also the stability of the entire object.

With known modelling compositions, the formation of cracks can be observed, particularly during drying. This cracking during drying can cause the modelling composition to disintegrate.

SUMMARY OF THE INVENTION

An object of the invention is to eliminate the disadvantages present in the state of the art. In particular, a modelling composition is to be indicated that has improved properties, so that there is no cracking either while the modelling composition is drying or in objects made from this modelling composition.

According to the invention, a compound is envisaged comprising starch, an adhesive agent, common salt, water, calcium chloride, sodium benzoate, potassium hydrogen sulphate, liquid paraffin, propylene glycol and bittern.

The adhesive agent is preferably ground sticky rice. The liquid paraffin consists of paraffin wax and/or paraffin hydrocarbons, particularly Paraffinium liquidum, Paraffinium perliquidum, Paraffinium sodium, soft paraffin and petrolatum, paraffin oil and white oil.

According to the invention, a modelling composition is also envisaged having the invented compound and other optional constituents. The modelling composition according to the invention may be air-dried or kiln-dried.

DETAILED DESCRIPTION OF THE PREFERRED EMBODIMENTS

The modelling compositions according to the invention may be advantageously used for children's play, as a supporting material in flower arranging, as a cleaning agent for models of typewriter, as a casting material and the like.

In an embodiment according to the invention, the modelling composition is made up exclusively of the compound and therefore contains no additional constituents. In another embodiment, the modelling composition is made up of the following, based on its weight, 90 to 100% by weight of the compound according to the invention and 10 to 0% by weight additives and/or aggregates.

The modelling composition according to the invention offers the particular advantage that cracking can be avoided during or after drying. Cracking during the drying of the modelling composition is in particular avoided. The modelling composition may be air-dried at room temperature. No cracks appear during this time, although the objects made dry out completely. The objects obtained from the modelling composition according to the invention are unbreakable once they have dried. This means they can be used as a toy in just the same way as the modelling composition itself.

In addition, cracks are prevented from forming in the surface of objects made from the modelling compositions according to the invention while they are being used after drying. In addition, the modelling compositions according to the invention can be produced cost-effectively without additives. They can be used over a wide temperature range.

A preferred modelling composition is made up of the following compound according to the invention:
25.0 to 35.0% starch
20.0 to 30.0% adhesive agent
0.1 to 5.0% common salt
20.0 to 30.0% water
5.0 to 10.0% calcium chloride
0.1 to 2.5% sodium benzoate
0.01 to 1.0% potassium hydrogen sulphate
0.1 to 5.0% liquid paraffin
0.1 to 5.0% propylene glycol
0.00001 to 0.001% bittern,
provided the total of all components equals 100.00% by weight. The modelling composition contains no further constituents.

The percentages used in the present invention are percentages by weight and, unless otherwise specified, relate to the weight of the compound.

A particularly preferred modelling composition is made up of the following compound according to the invention:
34.314% starch
24.510% adhesive agent
1.961% common salt
26.6468% water
7.843% calcium chloride
1.3725% sodium benzoate
0.255% potassium hydrogen sulphate
1.961% liquid paraffin
0.980% propylene glycol
0.0001% bittern
and contains no further constituents.

To produce an object, the modelling composition according to the invention is preferably air-dried after the object has been modelled.

The invention also relates to a method of producing a modelling composition having the composition as described in any of the embodiments described above, consisting of
(a) the supply of the components making up the compound according to any of the embodiments described above;
(b) the supply of the additives and/or aggregates envisaged where necessary; and
(c) the mixing of the components supplied in step (a) and the additives and/or aggregates supplied in step (b) to produce a homogenous mixture.

The use of the modelling composition to produce an object in accordance with the invention consists of
(a) the supply of the modelling composition;
(b) the moulding of the modelling composition to form the object; and
(c) the drying of the moulded modelling composition in the air to obtain the object.

The invention is described in greater detail below, using an example that is in no way intended to limit the scope of the invention.

EXAMPLE

A modelling composition according to the invention consisting of the following compound was produced by mixing the components
34.314% starch
24.510% ground sticky rice
1.961% common salt
26.6468% water
7.843% calcium chloride
1.3725% sodium benzoate
0.255% potassium hydrogen sulphate
1.961% liquid paraffin
0.980% propylene glycol
0.0001% bittern Mixing continued until a homogenous blend was obtained. After moulding, the modelling composition was air-dried. Objects produced from the modelling composition displayed good performance characteristics. No cracking was observed. The objects could not be destroyed during the course of normal child play and were therefore unbreakable.

The invention therefore consists of a modelling composition in which there is no cracking likely to cause the modelling composition to disintegrate either during drying or during drying of the objects made from said composition, wherein the modelling composition contains a compound made up of the components starch, an adhesive agent, common salt, water, calcium chloride, sodium benzoate, potassium hydrogen sulphate, liquid paraffin, propylene glycol and bittern, preferably in the percentage proportions by weight indicated above.

The invention claimed is:

1. A compound for a modelling composition comprising;
starch
ground sticky rice
common salt
water
calcium chloride
sodium benzoate
potassium hydrogen sulphate
liquid paraffin
propylene glycol
bittern.

2. The compound according to claim 1,
wherein
it is made up of
25.0 to 35.0% starch
20.0 to 30.0% ground sticky rice
0.1 to 5.0% common salt
20.0 to 30.0% water
5.0 to 10.0% calcium chloride
0.1 to 2.5% sodium benzoate
0.01 to 1.0% potassium hydrogen sulphate
0.1 to 5.0% liquid paraffin
0.1 to 5.0% propylene glycol
0.00001 to 0.001% bittern,
based on the weight of the compound in each case, provided the total of all components equals 100.00% by weight.

3. The compound according to claim 1 further comprising:
34.314% starch
24.510% ground sticky rice
1.961% common salt
26.6468% water
7.843% calcium chloride
1.3725% sodium benzoate
0.255% potassium hydrogen sulphate
1.961% liquid paraffin
0.980% propylene glycol
0.0001% bittern,
based on the weight of the compound in each case.

4. A modelling composition, comprising:
(a) 90 to 100% by weight of the compound according to claim 1 and
(b) 10 to 0% by weight additives and/or aggregates.

5. The modelling composition according to claim 4, wherein the additives and/or aggregates further include colouring substances.

6. A method of producing a modelling composition according to claim 4, comprising the steps of:
(a) supplying components making up a compound comprising:
starch
ground sticky rice
common salt
water
calcium chloride
sodium benzoate
potassium hydrogen sulphate
liquid paraffin
propylene glycol
bittern;
(b) supplying additives and/or aggregates envisaged where necessary; and
(c) mixing of the components supplied in step (a) and the additives and/or aggregates supplied in step (b) to produce a homogenous mixture.

7. The method according to claim 6, wherein the composition in step (a) is made up of
25.0 to 35.0% starch
20.0 to 30.0% ground sticky rice
0.1 to 5.0% common salt
20.0 to 30.0% water
5.0 to 10.0% calcium chloride
0.1 to 2.5% sodium benzoate
0.01 to 1.0% potassium hydrogen sulphate
0.1 to 5.0% liquid paraffin
0.1 to 5.0% propylene glycol
0.00001 to 0.001% bittern, based on the weight of the compound in each case, provided the total of all components equals 100.00% by weight.

8. The method according to claim 6, wherein the composition in step (a) further comprises:
34.314% starch
24.510% ground sticky rice
1.961% common salt
26.6468% water
7.843% calcium chloride
1.3725% sodium benzoate
0.255% potassium hydrogen sulphate
1.961% liquid paraffin
0.980% propylene glycol
0.0001% bittern,
based on the weight of the compound in each case.

9. A method of making an object from a modelling composition according to claim 4, comprising the steps of:
(a) supplying the modelling composition;
(b) moulding the modelling composition to form the object; and
(c) drying the moulded modelling composition in the air to obtain the object.

* * * * *